(12) United States Patent
Van Horn et al.

(10) Patent No.: US 8,648,123 B2
(45) Date of Patent: Feb. 11, 2014

(54) HYDROFLUOROPROPENE BLOWING AGENTS FOR THERMOPLASTICS

(75) Inventors: Brett L. Van Horn, King of Prussia, PA (US); Maher Y. Elsheikh, Wayne, PA (US); Benjamin Bin Chen, Wayne, PA (US); Philippe Bonnet, Lyons (FR)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 13/342,247

(22) Filed: Jan. 3, 2012

(65) Prior Publication Data

US 2012/0108688 A1 May 3, 2012

Related U.S. Application Data

(62) Division of application No. 12/532,207, filed as application No. PCT/US2008/058592 on Mar. 28, 2008, now abandoned.

(60) Provisional application No. 60/908,762, filed on Mar. 29, 2007.

(51) Int. Cl.
*C08J 9/14* (2006.01)
*C08J 9/00* (2006.01)
*C07C 21/18* (2006.01)

(52) U.S. Cl.
USPC .......................... 521/98; 570/126; 428/304.4

(58) Field of Classification Search
USPC .......... 428/304.4; 570/136, 126; 521/198, 98
See application file for complete search history.

(56) References Cited

U.S. PATENT DOCUMENTS

| | | | |
|---|---|---|---|
| 4,085,073 A | 4/1978 | Suh et al. | |
| 4,101,467 A | 7/1978 | Park et al. | |
| 5,205,956 A | 4/1993 | Volkert et al. | |
| 5,710,186 A * | 1/1998 | Chaudhary | 521/60 |
| 6,174,471 B1 * | 1/2001 | Park et al. | 264/53 |
| 6,858,571 B2 | 2/2005 | Pham et al. | |
| 2003/0175493 A1 | 9/2003 | Naito et al. | |
| 2004/0089839 A1 | 5/2004 | Thomas et al. | |
| 2004/0119047 A1 | 6/2004 | Singh et al. | |
| 2004/0127383 A1 | 7/2004 | Pham et al. | |
| 2006/0052466 A1 | 3/2006 | Handa | |
| 2006/0243944 A1 | 11/2006 | Minor et al. | |
| 2006/0243945 A1 | 11/2006 | Minor et al. | |
| 2007/0010592 A1 * | 1/2007 | Bowman et al. | 521/131 |
| 2007/0100010 A1 | 5/2007 | Creazzo et al. | |
| 2008/0157022 A1 | 7/2008 | Singh et al. | |
| 2010/0087555 A1 * | 4/2010 | Vo et al. | 521/56 |

FOREIGN PATENT DOCUMENTS

| | | |
|---|---|---|
| GB | 950876 | 2/1964 |
| WO | WO 2004/037752 A2 | 5/2004 |
| WO | WO 2004 037752 A2 | 5/2004 |
| WO | WO 2004/037752 A3 | 5/2004 |
| WO | WO 2004/037913 A2 | 5/2004 |
| WO | WO 2006/094303 A2 | 9/2006 |
| WO | WO 2006/094303 A3 | 9/2006 |

OTHER PUBLICATIONS

Sanchez, I. et al., Solubility of Gases in Polymers, Pure and Appl. Chem., vol. 62, No. 11, pp. 2107-2114—1990.
Daigneault, L. E. et al., Solubility of Blowing Agents HCFC 142b, HFC134a, HFC 125 and Isopropanol in Polystyrene, Journal of Cellular Plastics, vol. 34, pp. 219-230—May-Jun. 1988.
Vachon, C., Research on Alternative Blowing Agents, Thermoplastic Foam Processing—Principles and Development, R. Gendron—ed., pp. 141-159, 2005.
Gorski, R.A. et al., Physical Properties of Blowing Agent Ploymer Systems—I. Solubility of Fluorocarbon Blowing Agents in Thermoplastic Resins—pp. 286-299.
Sato, Y. et al., Solubility of Hydrocarbon (HFC-134a, HFC-152A) and Hydrochlorofluorocarbon (HCFC-142b) Blowing Agent in Plystyrene, Polym. Eng. Sci., vol. 40, No. 6 pp. 1369-1375, 2000.
Paquet, A., An Evaluation of the Thermal Conductivity of Extrude Polystyrene Foam Blown wiht HFC-134a or HFC-142b, J. Cell Plast., vol. 40., pp. 205-228, 2004.
Shu, K.W., Ridgid Polystrene Foams and Alternative Blowing Agents, Modern Syreneic Polymers—Polystyrenes and Styrenic Copolymers, pp. 203-231, 2003.

* cited by examiner

*Primary Examiner* — Randy Gulakowski
*Assistant Examiner* — Kara Boyle
(74) *Attorney, Agent, or Firm* — Steven D. Boyd

(57) ABSTRACT

The present invention relates to blowing agent compositions comprising the unsaturated halogenated hydroolefin 3,3,3-trifluoropropene (HFO 1243zf) and combinations including primarily 3,3,3-trifluoropropene (HFO 1243zf). The blowing agent compositions are useful in that they provide sufficient plasticization to permit the production of low density insulating thermoplastic foams with improved k-factor.

21 Claims, No Drawings

HYDROFLUOROPROPENE BLOWING AGENTS FOR THERMOPLASTICS

The present application is a divisional application of U.S. patent application Ser. No. 12/532,207 filed Sep. 21, 2009 which claimed priority to International patent application serial number PCT/US08/58592 filed Mar. 28, 2008 which claimed priority to U.S. provisional patent application Ser. No. 60/908,762 filed Mar. 29, 2007.

SUMMARY OF INVENTION

The present invention relates to blowing agent compositions comprising the unsaturated halogenated hydroolefin, 3,3,3-trifluoropropene (HFO 1243zf or TFP), alone and in combination with compatible materials used in the preparation of thermoplastic foam compositions. HFO 1243zf blowing agent compositions are useful in that they provide sufficient plasticization to permit the production of low density insulating foams with improved k-factor.

BACKGROUND OF INVENTION

HFC's, being non-ozone depleting compounds, have been identified as alternative blowing agents to chlorofluorocarbons (CFCs) and hydrochlorofluorocarbons (HCFCs) in the production of thermoplastic foams. However, it has been found that it can be more difficult to process thermoplastic foams being blown with HFC's than with CFC's or HCFC's. For instance in the production of extruded polystyrene (XPS) foam, HFC-134a (tetrafluoroethane) and HFC-125 (pentafluoroethane) have limited solubility and higher degassing pressure in the thermoplastic resin than either CFC-12 (dichlorodifluoromethane) or HCFC-142b (1-chloro-1,1-difluoroethane). This requires foam extrusion systems to be operated at a higher pressure to keep the blowing agent in solution and prevent premature degassing before the die. The higher degassing pressure makes the foaming more difficult to control and the higher operating pressure may be too high for some extrusion systems.

Though HFCs do not deplete the stratospheric ozone many HFCs have relatively high global warming potentials (GWP) compared to atmospheric gas blowing agents like carbon dioxide ($CO_2$) and nitrogen ($N_2$).

The use of hydrofluoroolefins in general in blowing agent compositions has been disclosed in references including US Pat. Publication 2004089839, US Pat. Publication 2004119047, WO 2004/037913, and US Pat. Publication 2007100010. However, the specific advantages and benefits of using TFP as a blowing agent in thermoplastic resins have not been disclosed. It was discovered that while some of the compounds listed in the generic formulas given for hydrofluoroolefins in these references may be effective in blowing agent compositions for the production of low density thermoplastic foams, others are not. To those skilled in the art, it is understood that almost any volatile material with an appreciable solubility in a thermoplastic resin can provide some blowing agent activity and reduce the density of a thermoplastic resin product. However, those skilled in the art recognize that the difficulty is in finding blowing agents that are capable of producing foamed products with useful characteristics. The present invention is directed towards the discovery that TFP is a particularly effective blowing agent for thermoplastic foams including extruded polystyrene foams. TFP blowing agents can produce low density, closed-cell thermoplastic foams with controllable cell size that are useful as thermal insulating foams.

WO 2004/037913 and US Pat. Publication 2004119047 disclose a generic formula for HFOs that includes TFP but teach that fluoropropenes containing additional fluorine are preferred, specifically tetrafluoropropenes and pentafluoropropenes, and even more preferred are HFO-1234ze, HFO-1234yf, and HFO-1225ye, and any stereo isomers thereof. There is no disclosure of any advantages of using TFP. The present inventors have discovered that HFO-1234ze, HFO-1234yf, and HFO-1225ye have lower solubility in polystyrene resin than TFP and therefore are not expected to be as efficient blowing agents for polystyrene. It is known that solubility of a blowing agent in the thermoplastic resin is critical in determining its potential for use in producing low density foams. The solubility determines the quantity of blowing agent that can be incorporated into the resin, which in turn is crucial in determining the degree of density reduction achievable. These references also disclose that TFP may not be suitable for many applications due to its flammability. However, the inventors of the present invention have found TFP to be suitable for thermoplastic foaming applications, particularly of polystyrene.

US Pat. Publication 2007100010 discloses blowing agent compositions comprising components from a generic formula for unsaturated hydrofluorocarbons or hydrofluoroolefins along with an additional list of unsaturated hydrofluorocarbons. However, the examples demonstrating the use of these formulations as blowing agents in thermoplastic resin and polystyrene foams only give typical operating conditions for a foam extrusion process familiar to one skilled in the art. There are no actual examples of extrusion foaming using hydrofluoroolefins. Furthermore, there is no mention of any specific blowing agents to use. The actual examples of foaming that are given are limited to thermosetting foams such as polyurethane or polyisocyanate and demonstrate the use of longer chain HFOs where the unsaturated bond is not on a terminal carbon, including 1,1,1,4,4,5,5,5-octafluoro-2-pentene (HFO-1438mzz) and 1,1,1,4,4,4-hexafluoro-2-butene (Z-HFO-1336mzz). Those skilled in the art recognize that an effective blowing agent for polyurethane foaming systems will not necessarily be effective in thermoplastic foaming systems.

US Pat. Publication 2006243944 discloses numerous compositions comprising combinations of materials which include a combination of TFP and at least one other compound selected from a specific list including numerous HFCs and hydrocarbons. The combinations are described as being useful for a variety of uses including use as blowing agents. There is no specific disclosure of the use of TFP for thermoplastic foaming, nor are examples of TFP in blowing agent formulations disclosed. Furthermore, no formulations for producing expandable resin compositions are disclosed, and no blowing agent compositions useful for foaming are disclosed. Many compositions covered by the broad disclosure are not suitable for producing low density closed-cell foams.

U.S. Pat. No. 6,858,571 and WO 2004/037742 disclose azeotrope-like compositions that contain pentafluoropropene (HFO-1225) and a second fluid from the group consisting of 3,3,3-trifluoropropene ("HFO-1243zf"), 1,1-difluoroethane ("HFC-152a"), trans-1,3,3,3-tetrafluoropropene ("HFO-1234ze"), and combinations of two or more thereof. The use of these azeotropes as blowing agents is mentioned. However, these references do not teach preferred compositions for the foaming of thermoplastics, and many of the compositions disclosed will not be as useful as blowing agents particularly for polystyrene due to the high content of HFO-1225, which the present inventors found not to be a particularly good blowing agent for polystyrene. These references do not disclose the particular value of TFP as a blowing agent nor the benefits of TFP over HFO-1225 in terms of solubility and therefore ability to achieve a lower foam density. Furthermore they do not disclose that TFP would be useful as a blowing agent in the absence of HFO-1225, as this reference is specific to compositions including HFO-1225; in the present invention it was discovered that TFP is a particularly useful blowing agent for thermoplastic foams either by itself or in combination with other coblowing agents and cosolvents.

U.S. Pat. No. 5,205,956 discloses the use of vinyl fluoroalkanes of the formula CH2=CH—Cn-F(2n+1), where n is an integer from 1 to 6, in blowing agent formulations to replace CFC-11 and/or CFC-12. For replacement of CFC-11 and CFC-113, n is preferably from 3 to 6, and for replacement of CFC-12 n is preferably from 1 to 3. The examples disclose longer, higher boiling vinyl fluoroalkanes, including vinyl perfluoro-n-butane and vinyl perfluoro-n-hexane, in blowing agent formulations for polyurethane foaming. The present inventors found that the disclosed, preferred vinyl fluoroalkanes to replace CFC-12 in polystyrene, namely when n=2 and 3, have very low solubility in polystyrene resin and are therefore not predicted to be effective blowing agents for polystyrene. This is unexpected since TFP has a much lower boiling point than the other disclosed vinyl fluoroalkanes and therefore predicted to have a lower solubility in the resin. Furthermore, as explained by Sanchez and Rogers (1990) "Solubility of gases in polymers" Pure Appl Chem 62(11): 2107-2114, it is expected that in an homologous series of gases, such as alkanes, that solubility will increase with increasing size or length. As mentioned, the inventors discovered that this wasn't the case with TFP among the vinyl fluoroalkanes tested.

The examples in the patent are limited to polyurethane foam manufacture. No examples of manufacture of a thermoplastic foaming are provided.

U.S. Pat. No. 4,085,073 discloses blowing agent compositions containing chlorofluoromethane, bromochlorodifluoromethane, and mixtures thereof. Alone or with minor amounts of other halogen containing carbon compounds as blowing agents. The patent mentions TFP, along with a list of other halogenated compounds as possible diluents. The use of TFP as a blowing agent itself or as a significant fraction of the blowing agent formulation is not disclosed.

GB 950,876 discloses a process for the production of polyurethane foams. It describes that any suitable halogenated saturated or unsaturated hydrocarbon having a boiling point below 150° C., preferably below 50° C., can be used as the blowing agent. TFP is among the halogenated hydrocarbons listed however the examples all employ CFC-11 as the blowing agent. There is no disclosure related to blowing agents for thermoplastic foaming.

Historically, chlorofluorocarbon (CFC) compounds, such as CFC-12 (difluorodichloromethane) and CFC-11 (trichlorofluoromethane), and hydrochlorofluorocarbon (HCFC) compounds, such as HCFC-22, (chlorodifluoromethane), HCFC-141b (1,1-chloro-1-fluoroethane), and HCFC-142b (1-chloro-1,1-difluoroethane), were preferred blowing agents for the production of thermoplastic foams such as extruded polystyrene (XPS) foam. However, due to concerns with ozone depleting compounds and with the adoption of the Montreal Protocol for the protection of the stratospheric ozone layer, there has been a need to identify non-ozone depleting compounds to replace the ozone depleting CFC and HCFC blowing agents. The fluorocarbon industry was successful in developing new alternatives such as HFC-134a (1,1,1,2-tetrafluoroethane), HFC-32 (difluoromethane), or HFC-152a (1,1-difluoroethane) in blowing agent compositions for thermoplastic foaming.

Though HFCs do not deplete stratospheric ozone they generally still have a high global warming potential (GWP). Concern over climate change and global warming has increased the importance of developing low-GWP, non ozone depleting compounds that are useful in blowing agent compositions for thermoplastic foaming.

Furthermore, in the production of insulating foam it is desired to have low density foamed product that maintains a high, long term R-value (insulating value). Though HFC-134a can provide long term R-value it is not soluble enough in polystyrene to produce foam product to the same low density as with using HCFC-142b or CFC-12. HFC-134a also has a very high nucleation density such that foams produced with it tend to have a very fine cell structure, which is not desired in all applications. HFC-152a and HFC-32 can be used to produce lower density foams with larger cell sizes than with HFC-134a but their high diffusivities in polystyrene will result in foams that age faster and don't possess the same long term R-value.

DETAILED DESCRIPTION OF INVENTION

The present invention relates to the use of blowing agents with negligible ozone-depletion and low GWP based upon the unsaturated halogenated hydroolefin, 3,3,3-trifluoropropene (HFO 1243zf or TFP), particularly those blowing agent combinations that contain a significant fraction or are predominantly TFP. The present invention discloses blowing agent and foamable resin compositions useful for the production of foams with decreased density and improved k-factor that can be used as insulating foams where the blowing agent composition provides an adequate degree of plasticization that is necessary for producing usable foams.

Preferred embodiments of this invention are blowing agent compositions predominantly of unsaturated halogenated hydroolefin 3,3,3-trifluoropropene (HFO 1243zf or TFP), singly or in combination. The predominantly 3,3,3-trifluoropropene blowing agent can be added to a thermoplastic resin which is to be formed into foam in amounts of from about 1 pph to about 100 pph (parts per hundred with respect to resin), preferably from about 2 pph to about 40 pph, more preferably from about to about 3 pph to about 25 pph, and even more preferably from about 4 pph to about 15 pph of the blowing agent composition with respect to resin.

The inventors discovered that 3,3,3-trifluoropropene (TFP or HFO-1243zf) is an unexpectedly good blowing agent for thermoplastic resin, particularly polystyrene. TFP has negligible ODP and GWP, good preliminary toxicity profile, and desirable aerosol properties for foaming. It was discovered that TFP has an unexpectedly high solubility and low diffusivity in polystyrene, making it a particularly attractive blowing agent for the production of extruded polystyrene foam. Furthermore, it was discovered that TFP has a much lower nucleating density than HFC-134a when used in polystyrene foaming. This permits control of the foam cell structure when using TFP as a blowing agent by adjusting the level of any nucleating agent used, such as talc.

The importance of solubility of the physical blowing agent in determining its potential for use in polymer foaming is well known and documented in the literature including, among others: Daigneault L E, et al (1998) "Solubility of Blowing Agents HCFC-142b, HFC 134a, HFC 125 and Isopropanol in Polystyrene" J Cell Plast 34:219-230. Vachon C (2005) "Research on Alternative Blowing Agents" in *Thermoplastic Foam Processing: Principles and Development*. R Gendron, ed. CRC Press. Gorski R A, et al. (1986) "Physical Properties of Blowing Agent Polymer Systems—I. Solubility of Fluorocarbon Blowing Agents in Thermoplastic Resins" J Cell Plast 22:21-52. The blowing agent must be soluble enough in the resin at processing temperatures and pressures to be incorporated into the resin in sufficient quantity to achieve the target foam density.

It has also been shown that the physical properties of the blowing agent and polymer dominate the blowing agent solubility, with the blowing agent and polymer interactions playing a secondary role. As such, it has been shown that the solubility of different blowing agents in a resin usually trends with the boiling point of the pure component blowing agent or with the reverse of the pure component vapor pressure (as vapor pressure tends to decrease with increasing normal boiling point). Example references include: Daigneault L E, et al (1998) "Solubility of Blowing Agents HCFC-142b, HFC 134a, HFC 125 and Isopropanol in Polystyrene" J Cell Plast 34:219-230. Vachon C (2005) "Research on Alternative Blowing Agents" in *Thermoplastic Foam Processing: Principles and Development*. R Gendron, ed. CRC Press. Sato Y, et al (2000) "Solubility of Hydrofluorocarbon (HFC-134a, HFC-152a) and Hydrochlorofluorocarbon (HCFC-142b) Blowing Agents in Polystyrene" Polym Eng Sci 40:1369-1375. TFP was found to have an unexpectedly high solubility and good foamability with polystyrene as compared with other related compounds, namely the fluorinated propenes, such as HFO-1225ye and HFO-1234ze, and the higher boiling vinyl fluoroalkanes.

The diffusivity of the blowing agent in the thermoplastic resin will not only play a role in the foaming process but is also crucial for how the foamed product will age. For closed-cell, thermal insulating foams it is important that the blowing agent have a very low diffusivity in the polymer in order to remain in the cell gas to provide long-term insulation performance. If the blowing agent has high permeability from the foam (a so-called "fugitive" blowing agent) the foam will age quickly and lose its thermal insulation performance. This is a drawback of using HFC-152a (1,1-difluoroethane), HCFC-22 (chlorodifluoromethane), or carbon dioxide for the production of thermal insulating polystyrene foam (see Vo C (2004) "An Evaluation of the Thermal Conductivity of Extruded Polystyrene Foam Blown with HFC-134a or HCFC-142b" J Cell Plast 40:205-228). TFP was found to have thermal conductivity and diffusivity in polystyrene on the order of that of HCFC-142b or HFC-134a and should therefore be useful in producing low density, closed-cell foam with good long-term insulating performance. This an advantage over HFC-134a or HFC-152a were we generally have to compromise on density and R-value, since 134a is not soluble enough to generate the lower density foam and 152a is too emissive to provide good long term R-value.

It was also discovered that TFP affords some control over cell size when foaming polystyrene. In contrast it is known that with HFC-134a it is difficult to produce low density foams with large cell size due to a high nucleation potential (such as shown in Vachon (2005)). Control over cell and the ability to produce foams with larger cell size than frequently seen with HFC-134a blown foams is important in achieving a balance between insulating properties and mechanical properties such as compression strength (sec Suh K W, Paquet A N (2003) "Rigid Polystyrene Foams and Alternative Blowing Agents" in *Modern Styrenic Polymers: Polystyrenes and Styrenic Copolymers*. J Scheirs, D B Priddy, ed. John Wiley & Sons). It was found that TFP is useful in producing closed-cell, insulating foams with improved cell size over HFC-134a blown foams.

The 3,3,3-trifluoropropene blowing agent compositions of the present invention can be combined with coblowing agents and/or additives such as hydrocarbons, halogenated saturated alkanes, halogenated unsaturated alkanes, hydrofluoroether (HFE), ketones, fluoroketones, atmospheric gases, inert gases, carbon dioxide, methyl formate, alcohols, trans-1,2-dichloroethylene, $CF_3SCF_3$, water, or mixtures thereof.

The halogenated saturated alkane can be a hydrofluorocarbon (HFC) such as HFC-134a (1,1,1,2-tetrafluoroethane), HFC-134 (1,1,2,2-tetrafluoroethane), HFC-152a (1,1-difluoroethane), HFC-152 (1,2-difluoroethane), HFC-32 (difluoromethane), HFC-143a (1,1,1-trifluoroethane), HFC-143 (1,1,2-trifluoroethane), fluoroethane, HFC-236fa (1,1,1,3,3,3-hexafluoropropane), HFC-236ca, HFC-227ea (1,1,1,2,3,3,3-heptafluoropropane), HFC-125 (pentafluoroethane), HFC-365mfc (1,1,1,3,3-pentafluorobutane), HFC-245fa (1,1,1,3,3-pentafluoropropane), and mixtures thereof.

The HFO can be HFO-1234ze (1,3,3,3-tetrafluoropropene), HFO-1234yf (2,3,3,3-tetrafluoropropene), HFO-1225ye (1,2,3,3,3-pentafluoropropene), HFO-1225zc (1,1,3,3,3-pentafluoropropene), HFO-1438mzz (1,1,1,4,4,5,5,5-octafluoropent-2-ene), HFO-1336mzz (1,1,1,4,4,4-hexafluorobut-2-ene), and mixtures thereof. The HCFO can be HCFO-1233zd (1-chloro-3,3,3-trifluoropropene), HCFO-1233xf (2-chloro-3,3,3-trifluoropropene), dichloro-fluorinated propenes, and mixtures thereof.

The hydrocarbon can be a C3 to C6 hydrocarbon such as cyclopentane, normal pentane, neopentane, isopentane, isobutane, normal butane, or mixtures thereof. The atmospheric gas can be nitrogen. The inert gas can be helium, argon, and mixtures thereof. The alcohol can be ethanol, isopropanol, propanol, methanol, butanol, ethyl hexanol, and mixtures thereof.

Additional foam additives such as dyes, pigments, cell-controlling agents, fillers, antioxidants, extrusion aids, stabilizing agents, antistatic agents, fire retardants, IR attenuating agents, thermally insulating additives, plasticizers, viscosity modifiers, impact modifiers, gas barrier resins, carbon black, surfactants, and mixtures thereof can be added to the foamable resin to become a part of the foam.

EXAMPLES

Examples 1-10

Solubility and Diffusivity of Gases in Polystyrene

The solubility and diffusivity of gases in polystyrene resin was measured using capillary column inverse gas chromatography (cc-IGC) as described in: Hadj Romdhane, Ilyess (1994) "Polymer-Solvent Diffusion and Equilibrium Parameters by Inverse Gas-Liquid Chromatography" PhD Dissertation, Dept. of Chem. Eng., Penn State University and Hong S U, Albouy A, Duda J L (1999) "Measurement and Prediction of Blowing Agent Solubility in Polystyrene at Supercritical Conditions" Cell Polym 18(5):301-313.

A 15 m long, 0.53 mm diameter GC capillary-column was prepared with a 3 micron thick polystyrene internal film coating. The column was installed into a Hewlet Packard 5890 Series II Gas Chromatograph with flame ionizer detector. Elution profiles for gases being tested were analyzed according the method outlined in the reference, using methane as the reference gas. The results give the diffusion coefficient of the gas through the polymer, Dp, and the solubility of the gas in the polymer in terms of the partition coefficient, K, which is the ratio of the concentration of the gas in the polymer phase to the concentration in the vapor phase. As such, the greater the value of K for a particular gas in the resin the greater its solubility in that resin.

Table 1 shows the partition coefficient and diffusivity values for several gases in polystyrene at 140° C. Comparative examples 1-4 show the solubility and diffusivity of HCFC-142b (1-chloro-1,1-difluoroethane), HFC-152a (1,1-difluoroethane), HFC-134a (1,1,1,2-tetrafluoroethane), and HFC-143a (1,1,1-trifluoroethane) in polystyrene (PS). Examples 5-9 show the solubility and diffusivity of HFO-1243zf (3,3,3-trifluoropropene), HFO-1234ze (1,3,3,3-tetrafluoropropene), HFO-1234yf (2,3,3,3-tetrafluoropropene), HFO-1225ye (1,2,3,3,3-pentafluoropropene), HFO-1345zfc (3,3,4,4,4-pentafluorobut-1-ene), (E)-HFO-1336 ((E)-1,1,1,4,4,4-hexafluorobut-2-ene), and HFO-1447 (3,3,4,4,5,5,5-heptafluoropent-1-ene).

For examples 9-11, the GC elution times for HFO-1345zfc, (E)-HFO-1336, and HFO-1447 were so close to that of the reference compound, methane, that values for K and Dp could not be calculated. This is characteristic of compounds with very low solubility in column's stationary phase, in this case polystyrene.

TABLE 1

Partition Coefficient and Diffusivity of Gases in Polystyrene at 140° C. by Inverse Gas Chromatography

| Example | Gas | Bp (° C.) | Mw (g/mol) | K | Dp (cm$^2$/s) |
|---|---|---|---|---|---|
| 1 | HCFC-142b | −9.8 | 100.49 | 1.249 | 2.61E−08 |
| 2 | HFC-152a | −24.1 | 66.05 | 0.734 | 9.49E−08 |
| 3 | HFC-134a | −26.1 | 102.02 | 0.397 | 3.40E−08 |
| 4 | HFC-143a | −47.2 | 84.04 | 0.29 | >3E−08 |
| 5 | HFO-1243zf | −22 | 96.05 | 0.544 | 2.95E−08 |
| 6 | HFO-1234ze | −16 | 114.04 | 0.423 | 3.09E−08 |
| 7 | HFO-1225ye | −18 | 132.03 | 0.312 | 2.44E−08 |
| 8 | HFO-1234yf | −28.5 | 114.04 | 0.275 | >2E−08 |
| 9 | HFO-1345zfc | 5 | 146.06 | — | — |
| 10 | (E)-HFO-1336 | 8.5 | 164.05 | — | — |
| 11 | HFO-1447 | 32 | 196.07 | — | — |

The solubility of HFO-1243zf in polystyrene was found to be greater than that of HFC-134a or the other HFOs tested even though HFO-1243zf has a lower boiling point than HFO-1234ze, HFO-1225ye, HFO-1345zfc, (E)-HFO-1336, or HFO-1447. This is unexpected since it is known that for related compounds the solubility of gases in the resin is expected to trend with boiling point such that gases with lower boiling point also display lower solubilities in the resin. This behavior is shown with Comparative Examples 2-4 in that the solubility of those HFCs in polystyrene decreases with decreasing boiling point. Furthermore, the diffusivity of 1243zf in polystyrene is very low, and was found to be similar to that of 142b and 134a. This indicates that HFO-1243zf is a preferred blowing agent for polystyrene due to its good solubility and can provide long term R-value due to its low diffusivity.

Foam Extrusion

Examples 12-31

Extruded polystyrene foam was produced using a counter-rotating twin screw extruder with internal barrel diameters or 27 mm and a barrel length of 40 diameters. The screw design was suitable for foaming applications. The pressure in the extruder barrel was controlled with the gear pump and was set high enough such that the blowing agent dissolved in the extruder. The extruder die for most examples was an adjustable-lip slot die with a gap width of 6.35 mm. For examples 12 through 14, the die was a 2 mm diameter strand die with a 1 mm land length. Two grades of general purpose polystyrene were used for the extrusion trials and fed to the extruder at rates of either 2.27 or 4.54 kg/hr (5 or 10 lb/hr). Blowing agents were pumped into the polystyrene resin melt at a controlled rate using high pressure delivery pumps. In the extruder, the blowing agent is mixed and dissolved in the resin melt to produce an expandable resin composition. The expandable resin composition is cooled to an appropriate foaming temperature and then extruded from the die where the drop in pressure initiates foaming. In some examples, talc was used as a nucleating agent and was pre-blended with polystyrene to make a masterbatch of 50 wt % talc in polystyrene. Beads of this masterbatch were mixed with polystyrene pellets to achieve the desired wt % talc in each experiment.

A portable halocarbon detector was used to verify that there were no significant leaks of blowing agent from the extruder, such as out of the resin feed port, around the injector or pressure transducer ports, at adapter flanges, etc. Significant leaks of blowing agent from the extruder will result in uncertainty in the formulation or overestimation of the amount of blowing agent added. In all the examples no leak of blowing agent was detected.

The density, open cell content, and cell size was measured for foam samples collected during each run. Density was measured according to ASTM D792, open cell content was measured using gas pychnometry according to ASTM D285-C, and cell size was measured by averaging the cell diameters from scanning electron microscope (SEM) micrographs of foam sample fracture surfaces. SEM images are also used to observe the cell structure and qualitatively check for open cell content. Table 2 shows data for examples 12 through 31, including the loading of each blowing agent in the formulation, the resin feed rate, melt flow index of the resin, the concentration of talc nucleating agent in the resin, the expandable resin melt temperature, and the density, cell size, and open cell content of the resulting foamed product. The specifics of these examples is described below:

TABLE 2

TFP Blown XPS Foam

| | Blowing Agent Loading | | | | | Polystyrene Resin | | | | Foam Properties | | |
|---|---|---|---|---|---|---|---|---|---|---|---|---|
| Example | 134a (wt %) | TFP (wt %) | CO$_2$ (wt %) | 1234yf (wt %) | 1233zd (wt %) | Feed (kg/hr) | MFI (g/10 min) | %Talc in PS | T$_{melt}$ (° C.) | Density (kg/m$^3$) | Cell Size (mm) | OCC % |
| 12 | 5.9 | — | — | — | — | 4.54 | 11.0 | 0 | 134 | 58.3 | 0.12 | 16 |
| 13 | 6.4 | — | — | — | — | 2.27 | 4.0 | 0 | 113 | 57.5 | 0.07 | 42 |
| 14 | 6.4 | — | — | — | — | 2.27 | 4.0 | 0.5 | 111 | 60.9 | 0.06 | 23 |
| 15 | — | 4.1 | — | — | — | 4.54 | 4.0 | 0 | 124 | 263.5 | 1.12 | <5 |
| 16 | — | 4.1 | — | — | — | 4.54 | 4.0 | 0.5 | 124 | 92.9 | 0.31 | <5 |

TABLE 2-continued

TFP Blown XPS Foam

| | Blowing Agent Loading | | | | | Polystyrene Resin | | | | Foam Properties | | |
|---|---|---|---|---|---|---|---|---|---|---|---|---|
| Example | 134a (wt %) | TFP (wt %) | $CO_2$ (wt %) | 1234yf (wt %) | 1233zd (wt %) | Feed (kg/hr) | MFI (g/10 min) | %Talc in PS | $T_{melt}$ (°C.) | Density (kg/m³) | Cell Size (mm) | OCC % |
| 17 | — | 4.1 | — | — | — | 4.54 | 4.0 | 2.5 | 124 | 78.9 | 0.12 | <5 |
| 18 | — | 4.1 | — | — | — | 4.54 | 4.0 | 0.5 | 115 | 92.1 | 0.17 | <5 |
| 19 | — | 4.9 | — | — | — | 4.54 | 4.0 | 0.5 | 115 | 77.3 | 0.22 | <5 |
| 20 | — | 6.8 | — | — | — | 4.54 | 4.0 | 0.5 | 115 | 61.2 | 0.17 | <10 |
| 21 | — | 8.5 | — | — | — | 4.54 | 4.0 | 0.5 | 117 | 58.0 | 0.05 | <10 |
| 22 | — | 6.6 | — | — | — | 2.27 | 11.0 | 0.5 | 114 | 57.6 | 0.11 | <5 |
| 23 | — | 7.2 | — | — | — | 2.27 | 11.0 | 0.5 | 115 | 56.5 | 0.11 | <5 |
| 24 | — | 7.2 | — | — | — | 2.27 | 11.0 | 0.5 | 124 | 49.3 | 0.12 | <5 |
| 25 | 4.1 | 2.3 | — | — | — | 4.54 | 4.0 | 0 | 117 | 70.2 | <0.2 | 27 |
| 26 | 3.0 | 1.7 | — | — | — | 4.54 | 11.0 | 0 | 115 | 166.1 | non-uniform | <10 |
| 27 | 3.0 | 1.7 | — | — | — | 4.54 | 11.0 | 0.5 | 115 | 76.4 | uniform | <5 |
| 28 | — | 5.1 | 0.77 | — | — | 2.27 | 11.0 | 0.5 | 115 | 57.5 | 0.20 | <5 |
| 29 | — | 6.5 | — | — | 3.4 | 4.54 | 11.0 | 0.5 | 113 | 52.5 | 0.35 | <5 |
| 30 | — | — | — | 4.4 | — | 4.54 | 11.0 | 0.5 | 117 | 90.9 | 0.15 | <5 |
| 31 | — | — | — | 5.7 | — | 4.54 | 11.0 | 0.5 | 115 | 71.6 | 0.06 | 31.4 |

Comparative Examples 12-14

HFC-134a Blown Foam

Comparative examples 12 through 14 were produced using HFC-134a as the blowing agent. In examples 13 and 14, the wt % of 134a was maintained at 6.4 wt % while the talc content was adjusted from 0% to 0.5% in the polystyrene resin. The foams in examples 12 through 14 are typical for 134a blown foams in that the cell size tends to be less than about 0.15 mm, even when no nucleating agent is used which shows the difficulty in controlling cell size when using 134a as the only blowing agent. It was found to be difficult to produce extruded polystyrene foams using more than 7 wt % 134a in the formulation with this extrusion system as undissolved blowing agent lead to severe defects in the foam, such as blow holes, large voids, or foam collapse. This behavior is typical for foaming of polystyrene with HFC-134a Examples 15-17

Effect of Nucleating Agent when Foaming with TFP

In examples 15 through 17, TFP was used as the only blowing agent with a loading of 4.1 wt % in each case. The level of talc was adjusted from 0 to 2.5 wt % in the resin. Comparing examples 15 and 16 show that added just a little nucleating agent can have a dramatic impact on the density and cell size of the foamed product. Further density and cell reduction is possible with the addition of more nucleating agent as seen in example 16. Control of the cell structure is very important when producing foam as it can have a dramatic impact on the physical and transport properties of the foamed product.

Examples 18-24

TFP Blown Foams

Examples 18 through 24 show TFP blown foamed product produced at various TFP loadings at a resin melt temperature of 115° C.+/−2° C., except for example 24 extruded at a melt temperature of 124° C. Good quality, closed-cell, lower density foams were produced using TFP than had been produced using 134a as the blowing agent. Example 21, using 8.5 wt % TFP had good quality foam of small cell size except with occasional defects. This is similar to the case of comparative examples 13 and 14 which also showed occasional defects except that with TFP it is easier to produce closed-cell foam, as the examples show.

Example 25-27

TFP with 134a

Examples 25 through 27 were blown using HFC-134a and TFP as co-blowing agents. The difference between example 26 and example 27 is that no nucleating was used in the production of example 26, which was higher density with non-uniform cell size, having very large cells at the core with a skin having relatively small cells. Addition a nucleating agent, in example 27, permitted production of lower density foam with uniform cell size. These examples show the benefits of adding TFP as a coblowing agent, even if not used as the major component, in permitting more control of foaming as demonstrated with the effect of adding talc in examples 26 and 27 when the total blowing agent content was approximately 5 wt %.

Examples 28 and 29

TFP with Co-Blowing Agents

In example 28, carbon dioxide was used as coblowing agent with TFP and in example 29 HCFO-1233zd (predominantly the trans isomer) was used as the co-blowing agent. In both examples, low density, closed-cell foams with large cell size were produced.

Examples 30 and 31

HFO-1234yf

In examples 30 and 31 the blowing agent was essentially pure HFO-1234yf (2,3,3,3-tetrafluoropropene). At a loading of 6.5 wt % 1234yf, as shown in example 31, the foamed product had very small cell size, macrovoids, blowholes, high open cell content, and frequent periods of popping at the die caused by undissolved blowing agent. Increasing the content of 1234yf made these problems worse. TFP was found to be a preferred blowing agent over HFO-1234yf due to its higher solubility in the resin which permitted production of lower density, good quality foam.

Another embodiment of this invention are foamable resin compositions containing greater than about 1 parts per hundred (pph) and less than about 100 pph of the blowing agent composition with respect to resin, preferably greater than about 2 pph and less than about 40 pph, and more preferably greater than about 3 pph and less than about 25 pph, and even more preferably greater than about 4 pph and less than about 15 pph with respect to resin.

The process for preparing a foamed thermoplastic product is as follows: Prepare a foamable polymer composition by blending together components comprising foamable polymer composition in any order. Typically, prepare a foamable polymer composition by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin near or above its glass transition temperature (Tg), or melt temperature (Tm) for crystalline polymers.

A foamable polymer composition can contain additional additives such as nucleating agents, cell-controlling agents, dyes, pigments, fillers, antioxidants, extrusion aids, stabilizing agents, antistatic agents, fire retardants, IR attenuating agents and thermally insulating additives. Nucleating agents include, among others, materials such as talc, calcium carbonate, sodium benzoate, and chemical blowing agents such azodicarbonamide or sodium bicarbonate and citric acid. IR attenuating agents and thermally insulating additives include carbon black, graphite, silicon dioxide, metal flake or powder, among others. Flame retardants can include, among others, brominated materials such as hexabromocyclodecane and polybrominated biphenyl ether.

Foam preparation processes of the present invention include batch, semi-batch, and continuous processes. Batch processes involve preparation of at least one portion of the foamable polymer composition in a storable state and then using that portion of foamable polymer composition at some future point in time to prepare a foam.

A continuous process involves forming a foamable polymer composition and then expanding that foamable polymer composition in a non-stop manner. For example, prepare a foamable polymer composition in an extruder by heating a polymer resin to form a molten resin, blending into the molten resin a blowing agent composition at an initial pressure to form a foamable polymer composition, and then extruding that foamable polymer composition through a die into a zone at a foaming pressure and allowing the foamable polymer composition to expand into a foam. Desirably, cool the foamable polymer composition after addition of the blowing agent and prior to extruding through the die in order to optimize foam properties. Cool the foamable polymer composition, for example, with heat exchangers.

Foams of the present invention can be of any form imaginable including sheet, plank, rod, tube, beads, or any combination thereof. Included in the present invention are laminate foams that comprise multiple distinguishable longitudinal foam members that are bound to one another.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A foamed product produced comprising a thermoplastic resin and a blowing agent composition comprising 3,3,3-trifluoropropene and a hydrochlorofluoroolefin selected from the group consisting of 1-chloro-3,3,3-trifluoropropene, 2-chloro-3,3,3-trifluoropropene, and mixtures thereof, wherein said foam product has a density of below 65 kg/m$^3$, an average cell size of between about 0.05 mm to 1.0 mm and an open-cell content less than about 20% and said foamed product comprises less than 10 wt % of said blowing agent composition and said foamed product comprises from 5.1 to 8.5 wt % of said 3,3,3-trifluoropropene.

2. The foamed product of claim 1 with an average cell size between about 0.1 mm and 0.35 mm.

3. The foamed product of claim 1 wherein said blowing agent composition further comprises a hydrocarbon, halogenated saturated alkane, a hydro fluoroolefin, a hydrofluoroether, an unsaturated hydrofluoroether, a ketone, a fluoroketone, an atmospheric gas, an inert gas, carbon dioxide, methyl formate, an alcohol, trans-1,2-dichloroethylene, $CF_3SCF_3$, water, or mixtures thereof.

4. The foamed product of claim 3 where the halogenated saturated alkane is a hydrofluorocarbon.

5. The foamed product of claim 4 where the hydrofluorocarbon is selected from the group consisting of 1,1,1,2-tetrafluoroethane, 1,1,2,2-tetrafluoroethane, 1,1-difluoroethane, 1,2-difluoroethane, difluoromethane, 1,1,1-trifluoroethane, 1,1,2-trifluoroethane, fluoroethane, 1,1,1,3,3,3-hexafluoropropane, 1,1,1,2,3,3-hexafluoropropane, 1,1,1,2,3,3,3-heptafluoropropane, pentafluoroethane, 1,1,1,3,3-pentafluorobutane, 1,1,1,3,3-pentafluoropropane, and mixtures thereof.

6. The foamed product of claim 3 where said hydrofluoroolefin is selected from the group consisting of 1,3,3,3-tetrafluoropropene, 2,3,3,3-tetrafluoropropene, 1,2,3,3,3-pentafluoropropene, 1,1,3,3,3-pentafluoropropene, 1,1,1,4,4,5,5,5-octafluoropent-2-ene, 1,1,1,4,4,4-hexafluorobut-2-ene, and mixtures thereof.

7. The foamed product of claim 3 where said hydrocarbon is a C3 to C6 hydrocarbon.

8. The foamed product of claim 3 where said alkane is selected from cyclopentane, normal pentane, isopentane, isobutane, normal butane, or mixtures thereof.

9. The foamed product of claim 3 where said atmospheric gas is nitrogen.

10. The foamed product of claim 3 where said inert gas is selected from the group consisting of helium, argon, and mixtures thereof.

11. The foamed product of claim 3 where said alcohol is selected from the group consisting of ethanol, isopropanol, ethyl hexanol, methanol, butanol, and mixtures thereof.

12. The foamed product of claim 1 comprising from about 1 pph to about 100 pph of said blowing agent composition with respect to said thermoplastic resin.

13. The foamed product of claim 1 comprising from about 2 pph to about 40 pph of said blowing agent composition with respect to said thermoplastic resin.

14. The foamed product of claim 1 comprising from about 3 pph to about 25 pph of said blowing agent composition with respect to said thermoplastic resin.

15. The foamed product of claim 1 comprising from about 4 pph to about 15 pph of said blowing agent composition with respect to said thermoplastic resin.

16. The foamed product of claim 1 where the thermoplastic resin comprises a polyolefin.

17. The foamed product of claim 16 where said polyolefin is selected from the group consisting of polystyrene, polyethylene, polypropylene, and mixtures thereof.

18. The foamed product of claim 1 further comprising a nucleating agent.

19. The foamed product of claim 18 where said nucleating agent in talc.

20. The foamed product of claim 19 where the talc content is from a trace amount to less than about 2.5 wt % in the resin.

21. The foamed product of claim 1 further comprising additives selected from the group consisting of dyes, pigments, cell-controlling agents, fillers, antioxidants, extrusion aids, stabilizing agents, antistatic agents, fire retardants, IR attenuating agents, thermally insulating additives, plasticizers, viscosity modifiers, impact modifiers, gas barrier resins, carbon black, surfactants, and mixtures thereof.

\* \* \* \* \*